United States Patent [19]
Butler

[11] Patent Number: 4,721,175
[45] Date of Patent: Jan. 26, 1988

[54] RACK AND PINION STEERING GEAR ASSEMBLY

[75] Inventor: Philip M. Butler, Mudgley, Great Britain

[73] Assignee: TRW Cam Gears Limited, Clevedon, England

[21] Appl. No.: 933,782

[22] Filed: Nov. 24, 1986

[30] Foreign Application Priority Data

Dec. 6, 1985 [GB] United Kingdom ............... 8530121

[51] Int. Cl.$^4$ .............................................. B62D 5/22
[52] U.S. Cl. ........................................ 180/148; 74/18; 74/498; 403/50
[58] Field of Search ............... 180/148; 74/18, 18.2, 74/422, 498; 403/50, 51; 384/276, 282, 283

[56] References Cited

U.S. PATENT DOCUMENTS

| | | | |
|---|---|---|---|
| 3,369,411 | 2/1968 | Hires | 74/18.2 |
| 3,554,048 | 1/1971 | Adams | 74/498 |
| 3,786,903 | 1/1974 | Haga et al. | 74/18.2 X |
| 3,927,576 | 12/1975 | Colleti | 74/498 |
| 4,301,691 | 11/1981 | Walter | 180/148 X |

FOREIGN PATENT DOCUMENTS

| | | | |
|---|---|---|---|
| 59-192670 | 11/1984 | Japan | 74/498 |
| 1242813 | 8/1971 | United Kingdom. | |
| 1404986 | 9/1975 | United Kingdom. | |

Primary Examiner—David M. Mitchell
Assistant Examiner—Charles R. Watts
Attorney, Agent, or Firm—Tarolli, Sundheim & Covell

[57] ABSTRACT

A rack and pinion steering gear assembly has a rack bar 5 displaceable through a cylindrical bush 7 secured by a pin 38 in a rack bar housing 11. A flexible concertina-type bellows 21 is provided between the housing 11 and a tie rod on the end of the rack bar. The bush 7 has an annular recess 42 which is in constant communication by way of longitudinal grooves 39 in the surface of the bush with the interior of the bellows 21. The recess 42 coincides with an aperture 43 in the housing wall 11 within which is snap fitted a tubular plug 44 through which the bellows 21 breathes by way of the recess 42 and grooves 39. The bellows 21 can breathe through the plug 44 to atmosphere (preferably by way of a filter) or by way of a pipe to the interior of bellows located at the opposite end of the rack bar. The bush 7 can partly define a pressure chamber 23 of a piston and cylinder unit for power assisted steering.

12 Claims, 5 Drawing Figures

RACK AND PINION STEERING GEAR ASSEMBLY

TECHNICAL FIELD & BACKGROUND ART

This invention relates to a rack and pinion steering gear assembly of the well known kind in which a rack bar is longitudinally displaceable within a tubular housing in response to rotation of a pinion and one or each end of the rack bar has a linkage, usually a tie rod, extending therefrom and from which linkage or linkages a steering output is derived. With a gear of this kind it is conventional to provide a flexible enclosure, usually in the form of a bellows or boot, which extends from the tie rod to the housing to provide a sealed cover therebetween which alleviates the ingress of foreign matter to the interior of the housing (and to a universal joint which is usually provided between the tie rod and the rack bar) and flexes to accommodate longitudinal displacement of the rack bar. During longitudinal displacement of the rack bar the volume within the flexible enclosure changes and accordingly it is necessary to allow the enclosure to breathe and to expel air therefrom, or admit air thereto, as appropriate. Generally the enclosure for a rack and pinion steering gear is in the form of a plastics or rubber moulded concertina-type bellows which is arranged to breather to atmosphere or, in the case of a gear with a tie rod at each end of the rack bar and two bellows (one for each tie rod), from one bellows to the other. The latter arrangement is usually preferred since it permits a fully sealed assembly. It it conventional for the rack bar to be supported for its displacement by one or more bushes mounted within the housing and through which bushes it is longitudinally slidable. With wholly manual rack and pinion gears there is usually little problem in providing communication through the housing between bellows at each end of the rack bar by having slots or conduits through the bush by way of which the bellows can breathe from one to the other, for example as disclosed in G.B. Pat. No. 1,242,813. However, this technique of providing communication between two bellows directly through the housing is not always convenient or possible in the case of power assisted rack and pinion steering gears where it is usual that a hydraulically sealed piston and cylinder unit is formed between the rack bar and its housing (to provide the power assistance) and this unit generally renders impractical the aforementioned communication. Accordingly, where two bellows are provided with an end take-off power assisted rack and pinion gear it is conventional either, for each bellows to breather to atmosphere, or for the bellows to breather from one to the other by way of a pipe or conduit which communicates between the two bellows externally of the housing. U.S. Pat. No. 3,927,576 discloses a bellows which breathes to atmosphere by way of an air filter where the bellows is of a non-standard design or structure to accommodate the filter. G.B. Pat. No. 1,404,986 discloses the manner in which two bellows can breathe from one to the other by way of an external pipe where the bellows are also of non-standard form being specially moulded to permit attachment of the external pipe thereto. G.B. Pat. No. 2,038,255 also discloses an external pipe communicating between two bellows where a specially moulded pipe coupling is provided which snap engages with the rack bar housing and to which the bellows are fitted with the result that the external diameter of the rack bar housing may be inconveniently enlarged by the attachment of the pipe coupling.

It is an object of the present invention to provide a rack and pinion steering gear assembly of the kind generally discussed above and by which the disadvantages of the prior proposals are alleviated whereby the flexible enclosure or bellows may be of a conventional form (that is without special mouldings or attachments to facilitate breathing) and which includes means through which the bellows can breather that is relatively inexpensive and simple to incorporate within the assembly and is relatively unobtrusive on the exterior of the assembly; the present invention also has as an object to provide a means for permitting the flexible enclosure or bellows to breathe, particularly (but not essentially) in a power assisted rack and pinion steering gear.

STATEMENT OF INVENTION & ADVANTAGES

According to the present invention there is provided a rack and pinion steering gear assembly comprising a rack bar longitudinally displaceable within a tubular housing in response to rotation of a pinion; an end of the rack bar having a linkage extending therefrom from which linkage a steering output is derived; flexible enclosure means extending from the linkage to the housing to provide a sealed cover therebetween which accommodates longitudinal displacement of the rack bar; a bush mounted in the housing and within which the rack bar is slidably borne for its longitudinal displacement; means retaining the bush longitudinally relative to the housing; said bush having a peripheral recess adjacent to the housing wall and a longitudinally extending conduit which communicates between the recess and the interior of the enclosure means, and wherein a tubular plug is provided which is located within an aperture in the housing wall to communicate with said peripheral recess so that the interior of the enclosure means can breathe by way of the conduit and peripheral recess through said tubular plug during longitudinal displacement of the rack bar.

By the present invention it is envisaged that the bush by which the rack bar is longitudinally borne will be located in the rack bar housing, usually within an appropriate seating or by a mechanical fixing, so that the peripheral recess in the bush is automatically positioned in lateral alignment with the aperture in the rack bar housing within which the tubular plug is fitted so that the flexible enclosure means (which, for convenience, is hereinafter referred to as a bellows) can breathe through the plug by way of the longitudinally extending conduit (which is in constant communication with the interior of the bellows) and the peripheral recess in the bush. Accordingly, the bush may be a relatively simple moulding, for example with the longitudinally extending conduit being formed as one or more grooves in its outer periphery. The bush therefore serves the dual purpose of supporting the rack bar within the tubular housing and providing a communication through which the bellows adjacent thereto can breathe either to atmosphere or, by way of an external pipe or conduit extending from the plug (possibly integral therewith), to a second bellows at the opposite end of the rack bar. Where the bellows is intended to breather to atmosphere it is preferred that the tubular plug communicates with or includes an air filter through which the bellows breathes. The bush may comprise sealing means within the tubular housing and between the interior of the bellows and a chamber in the tubular housing on the side of the bush remote from the bellows. Such an arrangement is particularly advantageous where the gear assembly s of the power assisted type and the chamber on the side of the bush remote from the bellows may form a fluid pressure chamber which is part of a piston and cylinder device for providing power assistance to the steering in conventional manner.

Preferably the tubular plug extends through the wall of the housing to project laterally into the peripheral recess of the bush. To facilitate the location and retention of the tubular plug in the aperture, the plug is conveniently arranged to snap engage with the housing wall within the aperture. Where, as aforementioned, the tubular plug engages within the peripheral recess of the bush, such engagement may serve to retain the bush from longitudinal displacement relative to the housing.

Usually the bush will have a generally cylindrical profile or be circular in lateral section (for example, in the form of a stepped cylinder) and be located within a complementary shaped housing part while the peripheral recess is annular. This has the advantage that it is not necessary to accurately determine the rotational orientation of the bush relative to the housing to ensure that the aperture in the housing wall will coincide with the annular recess (provided that the bush is appropriately located longitudinally within the tubular housing).

Although reference is made above to a tubular plug it is to be realised that this is intended to extend to a form of plug which is tubular in nature so that the enclosure means can breather therethrough; for example the plug may substantially comprise a porous material through which air can pass (without the requirement for a bore) whereby the plug itself can serve as an air filter. It will also be realised that the plug may, for example, be metallic and welded or otherwise bonded in position to the housing.

DRAWINGS

One embodiment of the present invention as applied to a power assisted rack and pinion steering gear assembly with steering take-off linkages at each end of the rack bar and constructed in accordance with the present invention, will not be described, by way of example only, with reference to the accompanying illustrative drawings in which.

DETAILED DESCRIPTION OF DRAWINGS

Figure 1:
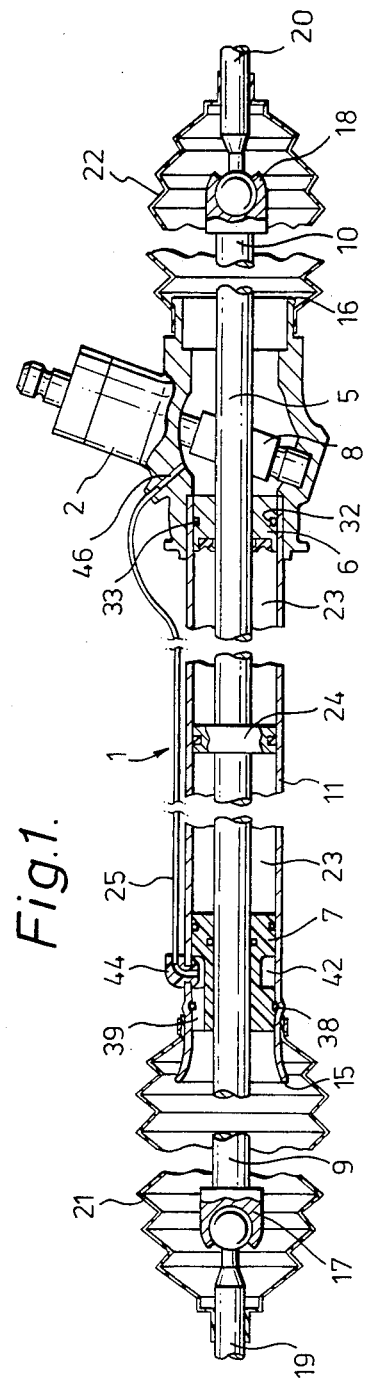
FIG. 1 is a longitudinal section through the assembly.

The rack and pinion steering gear assembly shown at 1 in FIG. 1 is predominantly of conventional form having a pinion housing 2 within which is rotatably mounted a pinion 8 engaging a rack on a longitudinally extending rack bar 5 so that rotation of the pinion results in longitudinal displacement of the rack bar relative to the pinion housing. An end part 10 of the rack bar extends from the pinion housing 2 while an opposite end part 9 of the rack bar extends through a generally cylindrical rack bar housing 11 formed as an extension of the pinion housing 2. The ends 9 and 10 of the rack bar extend from the tubular ends 15 and 16 of the housings 11 and 2 respectively and are coupled through ball joints 17 and 18 to tie rods 19 and 20 respectively. The tie rods 19 and 20 provide takeoff linkages through which a steering manoevure is effected on rotation of the pinion 8 in conventional manner. Extending between the tie rod 20 and pinion housing 2 is a tubular concertina-type bellows 22 of conventional symmetrical form, usually being moulded in plastics or rubber material. A similar type bellows 21 is provided between the tie rod 19 and the adjacent end of the tubular housing 11. The bellows 21 and 22 are securely attached to the components between which they respectively extend to form enclosures and alleviate the ingress of foreign matter into the housing parts 2 and 11 and to the ball joints 17 and 18.

The steering gear 1 is of the power assisted type and includes a double acting piston and cylinder unit comprising a piston 24 on the rack bar 5 which is longitudinally slidable in sealed manner within the housing 11 and has fluid pressure chambers 23 on opposed sides thereof. The chambers 23 are appropriately pressurised and exhausted in conventional manner to provide the power assistance in accordance with rotation of the pinion 8. The chambers 23 are formed by the piston 24 and tubular housing 11, in one case with a bearing bush 6 and in the other case with a bearing bush 7. Each of the bushes 6, 7 is generally cylindrical and received as a close fit within a complementary shaped part of the tubular housing 11. The rack bar 5 is longitudinally slidable through the bushes 6 and 7 and is restrained thereby against lateral displacement while both bushes are restrained against longitudinal displacement relative to the housing 11. Each bush has an external annular recess 32 within which is located a sealing ring 33 for sealing with the housing 11 and an internal annular recess 29 within which is located a sealing ring 30 for sealing with the rack bar 5.

Figure 4:
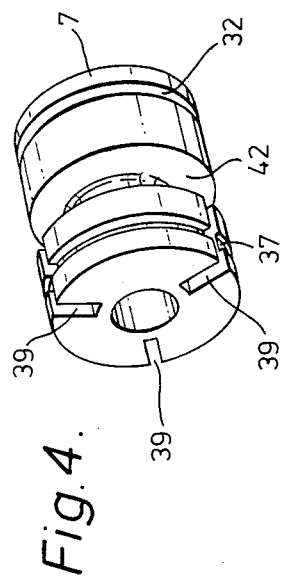
FIG. 4 is a perspective view of the bush within which the rack bar is borne.
Figure 2:
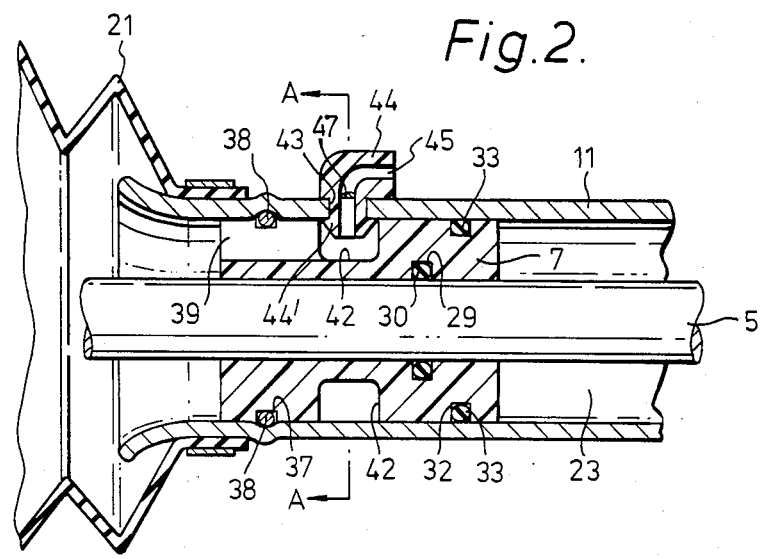
FIG. 2 is an enlarged sectional part of the assembly shown in FIG. 1 showing a bush within which the rack bar is longitudinally borne.
Figure 3:
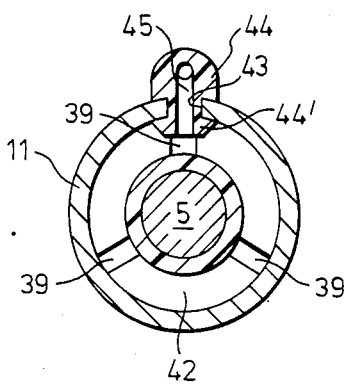
FIG. 3 is a section taken on the line A—of FIG. 2.
Figure 5:
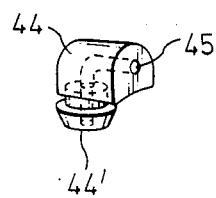
FIG. 5 is a perspective view of a tubular plug through which a bellows of the assembly is intended to breather.

The present invention is so far as it is directed to the described embodiment is primarily concerned with the arrangement of the bush 7 and is best appreciated with reference to FIGS. 2 to 4. The bush 7, which is conveniently formed as a plastics moulding, has an annular recess 42 in its outer cylindrical surface. Extending axially of the bush in the outer surface thereof to communicate between the annular recess 42 and the end of the bush adjacent to the bellows 21 are three blind-ended peripherally spaced grooves 39. With the bush located and retained in the tubular housing 11 as shown in FIG. 2, the annular recess 42 is positioned to coincide (in radial or lateral alignment) with a circular aperture 43 in the wall of the housing 11. In the present example the bush 7 is conveniently located and retained against longitudinal displacement in the housing 11 by a U-shaped wire pin 38 which is passed through holes in the wall of the housing 11 so that the legs of the pin effectively straddle the bush 7 on diametrically opposite sides thereof and are located within an annular recess 37 in the outer surface of the bush. The location of the pin 38 to retain the bush 7 serves to position the bush longitudinally so that the annular recess 42 coincides with the position of the aperture 43 in the wall of the housing 11. By providing the annular recesses 37 and 42 it will be apparent that there is no necessity to rotationally orientate the bush 7 within the housing 11 to any particular position. Located within the aperture 43 is a tubular plug 44, the bore 45 of which is in constant communication with the annular recess 42. The plug 44 is conveniently a plastics moulding having a frusto conical head 44' which snap engages over the wall of the housing 11 within the aperture 43 as shown in FIG. 3. During longitudinal displacement of the rack bar 5 through the bush 7 it will be apparent that the chamber formed within the bellows 21 will alternately expand and contract (while the chamber within the bellows 22 will respectively and alternately contract and expand) and to relieve pressure fluctuations within the bellows 21 the interior thereof is permitted to breathe by its constant communication with the bore 45 of the tubular plug 44 by way of the axial grooves 39 and the annular recess 42.

The bore 45 of the tubular plug can communicate with atmosphere in which case it is preferred that the plug 44 has associated therewith a filter 47 through which air is drawn into the bellows 21. In the present example however the bore of the plug 44 is in constant communication by way of a pipe or tube 25 which extends along the exterior of the housing 11 to communicate with a port 46 in the pinion housing 2, which port 46 is in constant communication with the interior chamber of the bellows 22. By this latter arrangement the interior of the bellows 21 and 22 can breathe from one to the other in a sealed system during longitudinal displacement of the rack bar. In the absence of the pipe 25, the bellows 22 may breathe to atmosphere through the port 46 (again, preferably, by way of an air filter).

I claim:

1. A rack and pinion steering gear assembly comprising a rack bar longitudinally displaceable within a tubular housing in response to rotation of a pinion; an end of the rack bar having a linkage extending therefrom from which linkage a steering output is derived; flexible enclosure means extending from the linkage to the housing to provide a sealed cover therebetween which accommodates longitudinal displacement of the rack bar; a bush mounted in the housing and within which the rack bar is slidably borne for its longitudinal displacement; means retaining the bush longitudinally relative to the housing; said bush having a peripheral recess adjacent to the housing wall and a longitudinally extending conduit which communicates between the recess and the interior of the enclosure means, and wherein a tubular plug is provided which is located within an aperture in the housing wall to communicate with said peripheral recess so that the interior of the enclosure means can breathe by way of the conduit and peripheral recess through said tubular plug during longitudinal displacement of the rack bar.

2. An assembly as claimed in claim 1 in which the longitudinally extending conduit in the bush comprises at least one longitudinally extending groove adjacent to the housing wall.

3. An assembly as claimed in claim 1 in which the bush comprises sealing means within the housing to provide a seal between the interior of the adjacent enclosure means and a chamber in the housing on the side of the bush remote from said enclosure means.

4. An assembly as claimed in claim 3 in which the chamber in the housing comprises a fluid pressure chamber forming part of a piston and cylinder unit for providing power assistance to steering.

5. An assembly as claimed in claim 1 in which the tubular plug snap engages with the wall of the housing within the aperture.

6. An assembly as claimed in claim 1 in which the tubular plug extends through the wall of the housing to project laterally into the peripheral recess.

7. An assembly as claimed in claim 6 in which the tubular plug engages within the peripheral recess to restrain longitudinal displacement of the bush relative to the tubular housing.

8. An assembly as claimed in claim 1 in which the means for retaining the bush longitudinally relative to the tubular housing serves to locate the peripheral recess to coincide with the aperture for mounting the tubular plug.

9. An assembly as claimed in claim 1 in which the means for retaining the bush longitudinally relative to the tubular housing comprises pin means which extends laterally through the housing wall and co-operates with a second peripheral recess in the bush adjacent to the housing wall.

10. An assembly as claimed in claim 1 in which the bush is generally cylindrical or circular in lateral section and is located within a complementary shaped housing part and said peripheral recess or recesses in the bush adjacent to the housing wall are annular.

11. An assembly as claimed in claim 1 in which the tubular plug includes an air filter through which the interior of the enclosure means breathes to atmosphere.

12. An assembly as claimed in claim 1 and having two linkages, one extending from each end of the rack bar, and two flexible enclosure means which are associated one with each linkage, and wherein the tubular plug associated with the bush adjacent to one said enclosure means is in sealed communication with the interior of the other enclosure means so that the two flexible enclosure means can breathe from one to the other and by way of said plug during longitudinal displacement of the rack bar.

* * * * *